(12) United States Patent
Burns

(10) Patent No.: US 6,854,335 B1
(45) Date of Patent: Feb. 15, 2005

(54) MAGNETICALLY COUPLED TIRE PRESSURE SENSING SYSTEM

(75) Inventor: Alan Alexander Burns, Portola Valley, CA (US)

(73) Assignee: MLHO, Inc., Portola Valley, CA (US)

( * ) Notice: Subject to any disclaimer, the term of this patent is extended or adjusted under 35 U.S.C. 154(b) by 0 days.

(21) Appl. No.: 10/764,711

(22) Filed: Jan. 26, 2004

Related U.S. Application Data

(60) Provisional application No. 60/529,211, filed on Dec. 12, 2003.

(51) Int. Cl.[7] ................................................. G01L 9/10
(52) U.S. Cl. ....................................................... 73/728
(58) Field of Search .......................... 73/722, 728, 146, 73/146.2, 146.3, 146.5, 146.8; 340/206.1, 442–448

(56) References Cited

U.S. PATENT DOCUMENTS

| | | | |
|---|---|---|---|
| 2,722,837 A | 11/1955 | Dwyer | |
| 3,807,232 A | 4/1974 | Wetterhorn | |
| 3,946,175 A | 3/1976 | Sitabkhan | |
| 4,006,402 A | 2/1977 | Micuzzi | |
| 4,339,955 A | 7/1982 | Iwasaki | |
| 4,374,475 A | 2/1983 | Hestich | |
| 4,627,292 A | 12/1986 | Dekrone | |
| 4,667,514 A | 5/1987 | Baer | |
| 4,807,468 A | 2/1989 | Galan | |
| 4,843,886 A | 7/1989 | Koppers et al. | |
| 4,866,982 A | 9/1989 | Gault | |
| 4,890,497 A | 1/1990 | Cahill | |
| 4,938,076 A | 7/1990 | Buchanan | |
| 5,103,670 A | 4/1992 | Wu | |
| 5,542,293 A | 8/1996 | Tsuda et al. | |
| 5,717,135 A | 2/1998 | Fioretta et al. | |
| 5,814,725 A | 9/1998 | Furuichi et al. | |
| 6,082,170 A | 7/2000 | Lia et al. | |
| 6,182,514 B1 | 2/2001 | Hodges | |
| 6,499,353 B1 | 12/2002 | Douglas et al. | |
| 6,520,006 B2 * | 2/2003 | Burns | 73/146 |
| 6,647,771 B2 * | 11/2003 | Burns | 73/146 |
| 6,662,642 B2 | 12/2003 | Breed et al. | |
| 6,761,072 B1 * | 7/2004 | Burns | 73/708 |

* cited by examiner

Primary Examiner—William Oen

(57) ABSTRACT

A tire pressure reporting and warning system employs low-cost passive magnetically coupled pressure senders within the tires. These senders employ permanent magnets that rotate in response to pressure and may conveniently be mounted on the valve stem. A sender comprises a high-permeability helical ribbon that translates in response to pressure and penetrates a magnetic circuit. The magnetic circuit rotates into alignment with the helical ribbon. A novel feature of this invention is the dual-purpose use of the magnet both as a means for producing rotation in response to pressure and simultaneously for producing the remotely sensed external magnetic field. The direction and strength of the external field depends both on the rotation of the magnet with respect to the tire and on the overall orbital motion as the tire rotates. Remote pressure readers at each wheel respond to the magnetic field components and interpret the response asymmetry in terms of tire pressure by continuously calculating response skew as the tires rotate. Analyzing skew obviates the need for tire rotation sensing and timing and eliminates magnetic strength effects. No special alignment is required between senders and readers, so the readers may be mounted rather arbitrarily nearby the vehicle wheels.

18 Claims, 9 Drawing Sheets

MAGNETICALLY COUPLED TIRE PRESSURE SENSING SYSTEM

CROSS-REFERENCES TO RELATED APPLICATIONS

This application claims the benefit of Provisional Patent Application Ser. No. 60/529,211, filed Dec. 12, 2003.

This Application is related to application Ser. No. 09/922,395 (now U.S. Pat. No. 6,520,006, issued Feb. 18, 2003), to application Ser. No. 09/927,736 (now U.S. Pat. No. 6,647,771, issued Dec. 18, 2003), and to application Ser. No. 10/191,612.

STATEMENT REGARDING FEDERALLY SPONSORED RESEARCH AND DEVELOPMENT

Not applicable.

BACKGROUND

1. Field of Invention

This invention relates specifically to vehicle tire pressure sensing and in general to remote pressure sensing.

2. Description of Prior Art

The U.S. Government has passed a law, known as the TREAD Act, requiring in-dash tire pressure reporting or warning systems for all new vehicles. U.S. Pat. No. 6,662,642 to Breed, et al, provides a good summary of the present art. Two main types of systems have emerged to meet this requirement—indirect and direct pressure sensing systems. The first, or indirect, type measures differential tire rotation speed to detect an anomalous rate for one tire, indirectly indicating under- or over-inflation. The advantage is passive operation with no in-tire components but the disadvantage is the inability to detect anomalous pressure in all tires. The second, or direct, type typically involves placing battery-operated transmitters within tires (possibly attached to or part of the tire valve stem) to transmit pressure readings to external receivers. While this permits sensing the pressure in all tires, the in-tire unit is relatively large due to the requirement for a battery. Another disadvantage is the periodic need to dismount tires to replace batteries. Alternative systems either try to generate sufficient electrical power internally through various means or transmit sufficient power into tires from external sources.

U.S. Pat. No. 6,520,006 to Burns discloses another direct approach. Here, a remote vehicular tire pressure reporting system comprises (1) an in-tire magnetic pressure sending apparatus wherein a permanent magnet is rotated mechanically in response to tire pressure plus (2) a magnetic pressure reading apparatus mounted on the vehicle containing sensors responsive to magnetic field direction. Advantages include passive operation that eliminates the need for battery replacement and sensing the direction rather than strength of a distant magnetic field. Magnetic field direction is more accurately controlled and measured than magnetic field strength. However, this system has the disadvantage of requiring coaxial alignment between the sender and receiver, at least once per wheel rotation, which limits location possibilities for both the sender and the reader. In the present improved invention, a method for reading the orientation of the sender field pressure reader that exploits wheel rotation during all or part of a rotation cycle lifts the restriction of coaxial alignment.

U.S. Pat. No. 6,647,771 also to Burns discloses another magnetically coupled tire pressure reporting system based on a novel magnetooptic display attached to the outer tire wall. However, this system does not meet the requirements for an in-dash pressure display.

U.S. Pat. No. 4,866,982 to Gault teaches a tire pressure monitoring system where a stationary Hall-effect sensor measures tangential spacing between a fixed magnet and a second magnet moveable in response to a linear pressure actuator. Changes in tangential spacing between the two magnets affect the timing between features in the combined magnetic field patter. Variations in timing are determined from the signal waveform generated as the spaced magnets, rotating with a wheel, sweep by a stationary sensor. U.S. Pat. No. 4,807,468 to Galan describes a similar system. Both Gault and Galan teach close coupling between magnet and sensor and an externally mounted magnetic sender requiring penetration into the pressurized interior of the tire and rim by a pressure line.

U.S. Pat. No. 5,814,725 to Furuichi et al, discloses a mechanism that penetrates a tire rim wherein a piston-driven screw rotates a permanent magnet Magnetic field strength is measured by a stationary Hall-effect sensor that is mounted transversely to the magnet rotation axis. U.S. Pat. No. 6,182,514 to Hodges also discloses a magnet in a bellows that moves to change the magnetic field strength at an external magnetic intensity sensor or magnetic switch. U.S. Pat. No. 4,667,514 to Baer describes a similar arrangement. These types of device typically share the same problems as the other devices that depend on sensing magnetic field strength rather than direction.

U.S. Pat. No. 3,807,232 to Wetterhorn teaches a self-contained gauge comprising a permanent magnet attached in place of the conventional dial pointer of a Bourdon tube pressure gauge so that it rotates with pressure. A magnetic compass sensor is coaxially aligned to detect the rotational direction of the magnet and hence the pressure. U.S. Pat. No. 6,499,353 to Douglas et al. discloses a virtually identical Bourdon tube and coaxial magnetic compass apparatus to that of Wetterhorn wherein the sender and compass are separated by and are perpendicular to the wall of the pressure vessel. However, Bourdon tubes are complex, bulky, and are too fragile for road tire use. Bourdon tube forces are also weak. Bourdon tubes further lack the ability to support and rotate the larger magnets required for vehicular application. Furthermore, the requirement for coaxial alignment perpendicular to the tire wall is unacceptable to vehicle designers.

Several mechanisms besides Bourdon tubes have been disclosed for converting translational pressure or force urging into rotary motion via mechanical coupling. U.S. Pat. No. 5,103,670 to Wu describes the use of a screw to convert linear displacement from a conventional bellows to actuate a directly viewed rotary dial or pointer. U.S. Pat. No. 6,082,170 to Lia et al. describes a blood pressure apparatus that uses a diaphragm bellows and a compressible helical ribbon spring to rotate a dial pointer. None of these types of device employs magnetic coupling for remote sensing.

U.S. Pat. No. 2,722,837 to Dwyer teaches a pressure dial apparatus comprising a magnetic circuit with a permanent magnet translated by pressure coupled through a diaphragm along a high permeability helix. The helix and attached dial pointer rotate in accordance with the longitudinal position of the magnetic circuit along the helix. Various improvements and variations of this basic system are disclosed in a series of later patents assigned to Dwyer Instruments, Inc., etc. (e.g., U.S. Pat. No. 4,374,475 to Hestich, U.S. Pat. No. 4,890,497 to Cahill, U.S. Pat. No. 4,938,076 to Buchanan, etc.) None of these disclose rotating a magnet in response to pressure or employing a rotated magnetic field for remote pressure sensing.

Numerous devices include mechanisms moving a permanent magnet in response pressure or other force to induce a sensed effect in a material responsive to variation in magnetic field strength. For example, U.S. Pat. No. 4,006,402 to Mincuzzi, U.S. Pat. No. 4,843,886 to Koppers et al. and U.S. Pat. No. 4,627,292 to Dekrone, each teach a device based on either magnetoresistance and magnetic saturation. U.S. Pat. No. 4,339,955 to Iwasaki discloses a mechanism that exploits variation in the incremental permeability of a magnetically soft material. These devices sense field strength instead of direction. Devices based on the sensing the strength of a magnetic field rather than field direction typically require a narrow spacing between the sensing means and the translated magnet. They are very sensitive to changes in spacing, small misalignments, and extraneous magnetic fields. Accordingly, such devices generally require careful and extensive calibration before measurements are made, and are generally unacceptable for tire pressure reporting.

Still other concepts of remote pressure sensing involve a change the state indicator responding a preset pressure level. For example, U.S. Pat. No. 3,946,175 to Sitabkhan teaches switching a magnetically susceptible reed in response to pressure actuated displacement of a magnet. U.S. Pat. No. 5,542,293 to Tsuda et al. describes a conventional bellows actuated mechanism that uses a fixed and a moveable magnet to switch the orientation of a third magnet. U.S. Pat. No. 5,717,135 to Fiorefta et al. discloses use of magnetic coupling to switch the state of a transducer from producing to not producing a signal. These types of mechanisms do not produce a continuous output responsive to pressure.

SUMMARY

Passive pressure senders placed within pressure vessels, such as a pneumatic vehicle tires, employ permanent magnets that rotate in response to pressure within vehicle tires. The direction and strength of the external magnetic field depends both on the rotation of the magnet with respect to the tire and on the overall orbital motion as the tire revolves. Remote pressure readers respond to the direction of the magnetic field and interpret the field direction changes in terms of tire pressure. In accordance with the present invention a magnetically coupled pressure sender comprises a pressure responsive bellows that translates a high-permeability helical ribbon element. In the preferred embodiment, the helical ribbon penetrates a central bore in a permanent magnet. Pole pieces at the end of the magnet that engage the helical ribbon across narrow gaps comprise, along with the magnet, a magnetic circuit free to otherwise rotate. The magnetic circuit will rotate to a position corresponding to minimum magnetic energy, which depends on the translated position of the helical ribbon. Thus a novel feature of this invention is the dual-purpose and simultaneous use of the sender magnet both as a means for producing magnet rotation in response to pressure and as a means for providing the remotely sensed distant magnetic field. Another novel feature of this invention is elimination of the previous requirement for special (i.e., coaxial) alignments of the remote pressure reader with the pressure sender, at least once per wheel revolution. The invented pressure reader continuously analyzes the asymmetry, or skew, of changes induced in the sensed magnetic field during the wheel revolution. Analyzing skew obviates the need for wheel rotation sensing and timing and eliminates magnetic strength effects. Each pressure reader associated with a particular wheel provides signals indicative of the associated tire pressure for separate display and warning. Conveniently, the pressure sender may be mounted on or part of the tire valve stem. Air passages bypassing the standard Schrader valve may implement the pressure sender as a gauge pressure sensor.

OBJECTS AND ADVANTAGES

Accordingly, objects and advantages of the present invention are:
(a) to provide a passive means from within a vehicle tire for reporting pressure;
(b) to provide a continuous reading of tire pressure;
(c) to provide a tire pressure reporting system with an indefinite lifetime;
(d) to eliminate any need for batteries within tires;
(e) to eliminate any need for power generation within tires:
(f) to eliminate any need for sources transmitting power into tires;
(g) to provide a low cost means for reporting tire pressure;
(h) to provide a compact and lightweight pressure sensor internal to tires;
(i) to provide a means for reporting tire pressure that does not require timing or sensing of wheel rotation;
(j) to provide independent tire pressure reporting for all vehicle wheels;
(k) to provide accurate tire pressure reporting;
(l) to provide tire pressure reporting referenced to a "cold" tire;
(m) to provide design flexibility for the installation of a tire pressure reporting system;
(n) to provide a gauge pressure reading;
(o) to provide an absolute pressure gauge;
(p) in general, to enhance vehicle safety.

Still further objects and advantages will become apparent from a consideration of the ensuing description and accompanying drawings.

DRAWING FIGURES

Figure 6A:
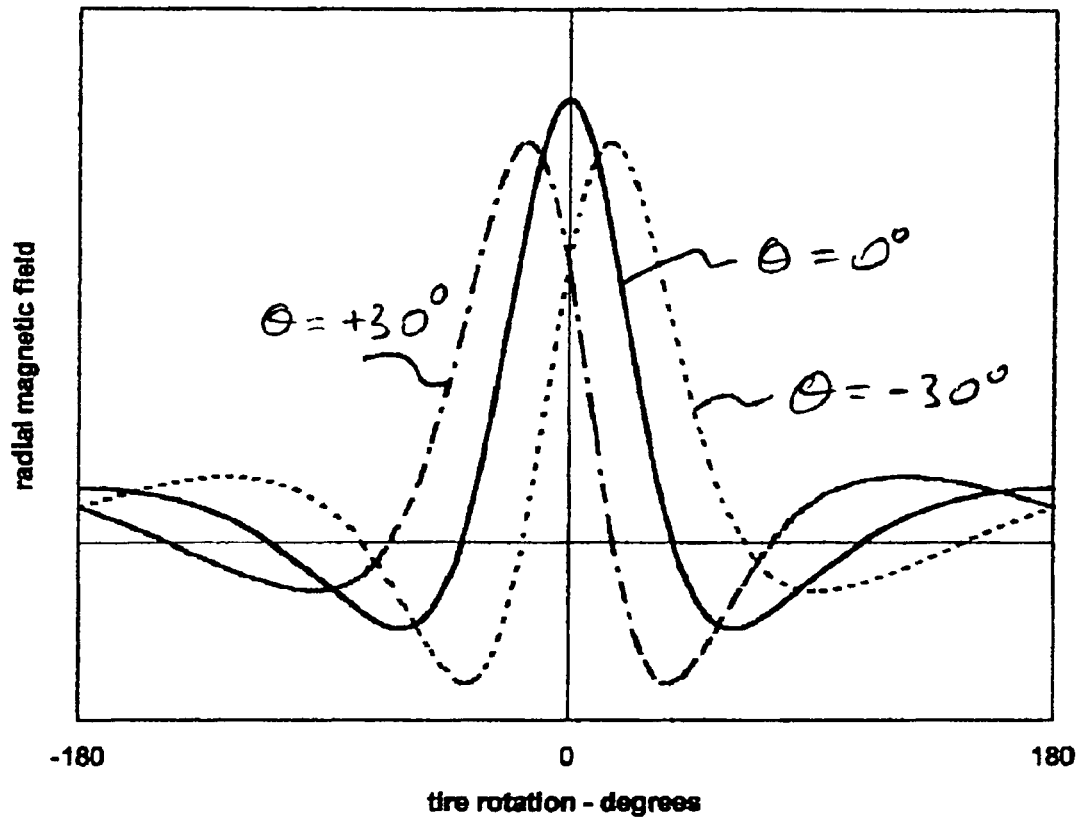

FIG. 6A plots examples of the radial magnetic fields at a magnetically coupled pressure reader versus tire revolution.

Figure 6B:
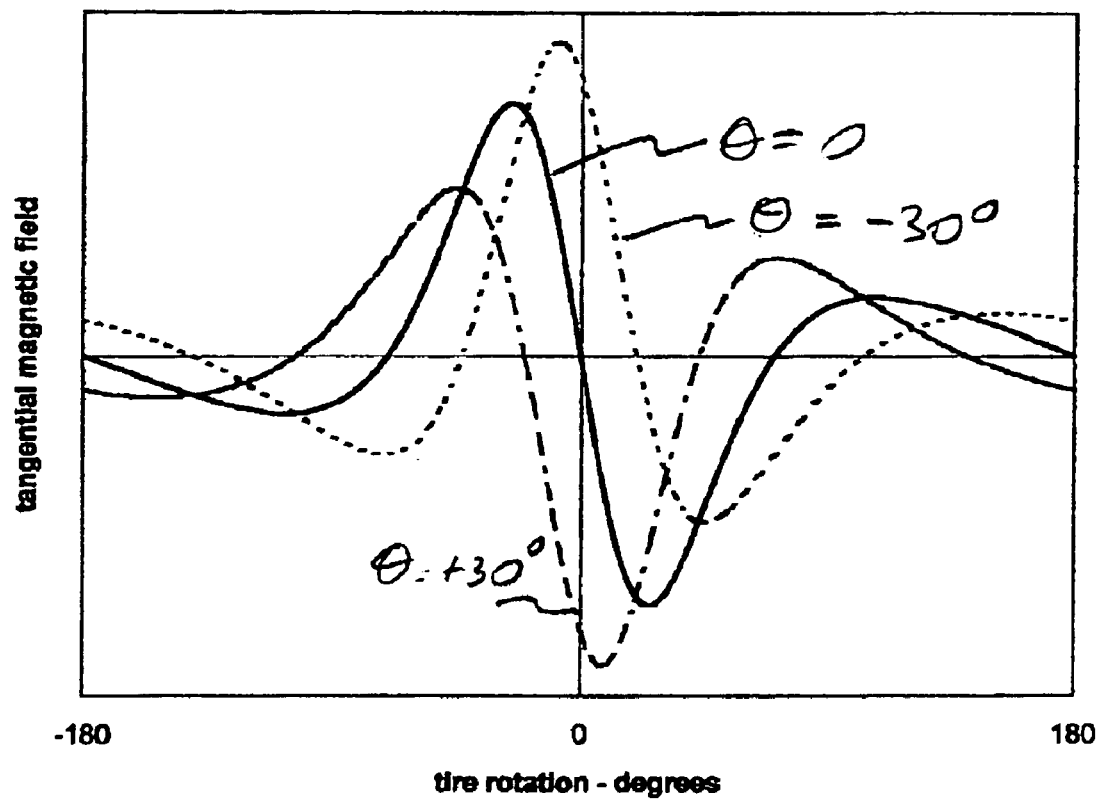

FIG. 6B plots the tangential magnetic fields at a magnetically coupled pressure reader versus tire revolution.

Figure 7:
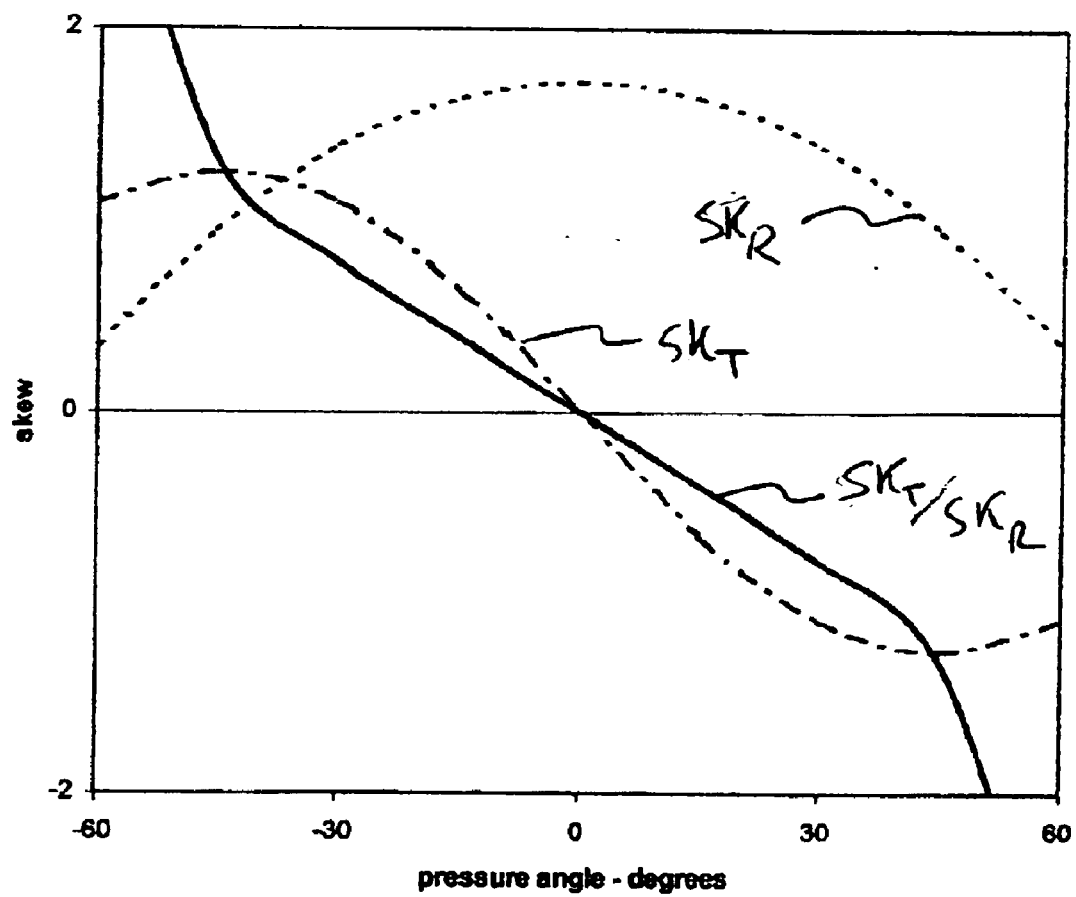

FIG. 7 plots the skew of the radial and tangential magnetic fields at a magnetically coupled pressure reader plus the ratio of radial to tangential skew versus pressure angle.

Figure 8:
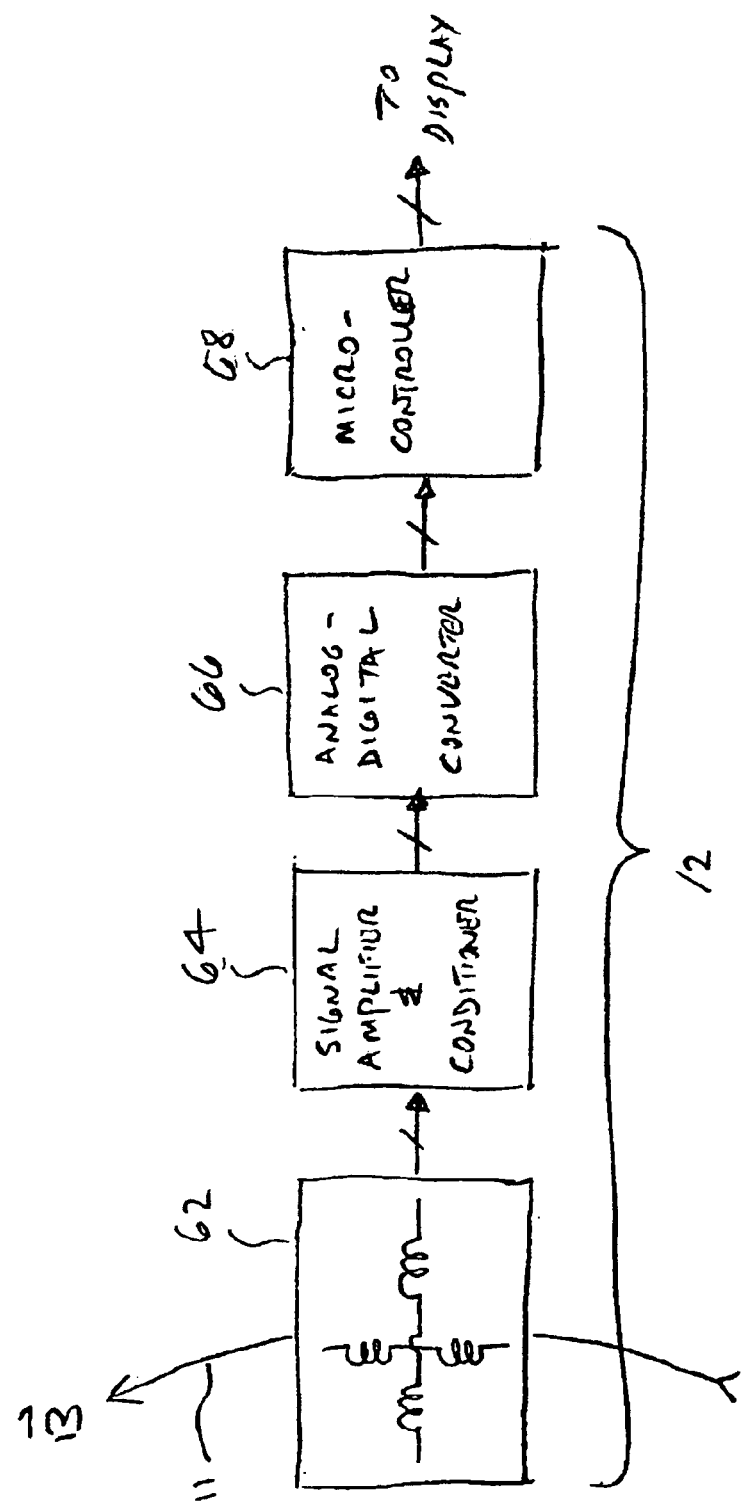

FIG. 8 is an electronic block diagram of a magnetically coupled pressure reader.

REFERENCE NUMERALS IN DRAWINGS

| 10 | magnetic pressure sender | 11 | magnetic field |
|----|--------------------------|-----|----------------|
| 12 | magnetic pressure reader | 13 | wheel |
| 14 | tire | 15 | rim |
| 16 | signal cabling | 18 | display device |
| 20 | pressure vessel | 22 | bellows |
| 24 | first end cap | 25 | second end cap |
| 26 | annular magnet | 28 | annular bearing |
| 30 | helical ribbon | 30A | helical ribbon |
| 31 | bearing | 32 | magnetic pole piece |
| 33 | spiral ribbon | 34 | pressure port |
| 36 | housing | 37 | cam follower |
| 38 | annular magnet | 39 | slot |
| 40 | bellows | 42 | bellows end cap |
| 44 | helical ribbon | 46 | housing end cup |
| 47 | bearing | 48 | magnetic pole piece |
| 49 | port | 50 | pressure vessel |
| 51 | wheel axle | 52 | body member |
| 53 | wheel rim | 54 | valve stem |
| 56 | Schrader valve | 58 | port |
| 60 | air passage | 62 | field sensor module |
| 64 | amplifier and conditioner | 66 | ADC |
| 68 | microcontroller | | |

DESCRIPTION

Figure 1:
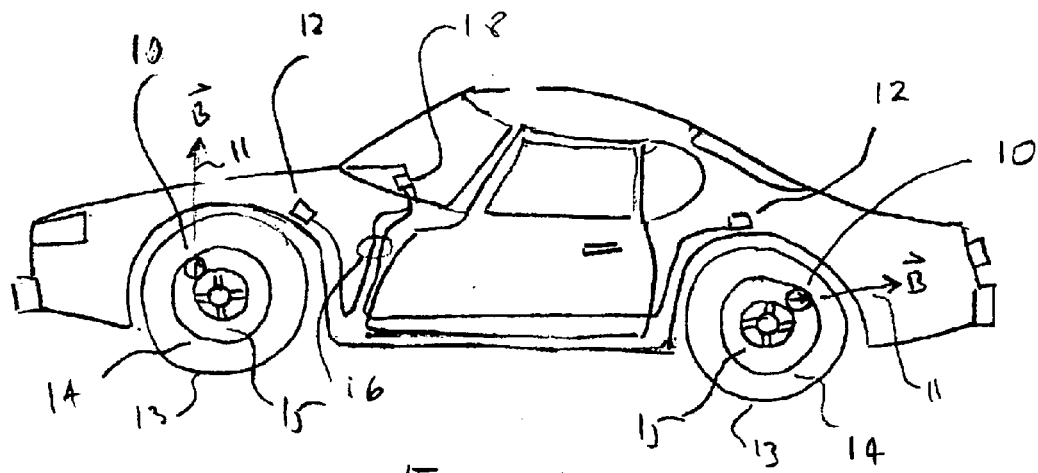
FIG. 1 shows an automobile with magnetically coupled pressure senders mounted inside the tires, pressure readers outside the tires, signal cables, and a pressure display unit.

Preferred Embodiment of the Overall Vehicle Tire Pressure Sensing and Reporting System FIG. 1 depicts the installation of the invented magnetically coupled tire pressure reporting system in a vehicle. Related arrangements are shown in U.S. Pat. Nos. 6,520,006 and 6,647,771 to Burns. The disclosures of these patents are incorporated herein by this reference. In particular, this invention relates to improvements to U.S. Pat. No. 6,520,006 to Burns. Burns teaches a method for externally sensing pressure of a fluid within a pressure vessel (e.g., a vehicle tire) comprising: (a) rotating a sender magnet inside of the pressure vessel in response to pressure within the vessel; (b) sensing the orientation of the rotated magnetic field outside the pressure vessel; and, (c) correlating the sensed orientation of the external magnetic field to pressure within the pressure vessel. The specific improvements of this invention are: (1) rotating the internal sender magnet by means of magnetic coupling to a helical element translated by pressure; and, (2) resolving the magnet orientation by analyzing properties of the sensed external magnetic field over all or part of a vehicle wheel rotation cycles.

Referring to FIG. 1, magnetically coupled pressure senders 10 are mounted inside pneumatic tires 14 mounted on wheel rims 15. Wheels 13 comprise rims 15 and tires 14. Pressure within each tire independently rotates magnets within a sender 10. Senders 10 provide associated external magnetic fields 11, each of whose orientations is fixed relative to its associated vehicle wheel 13. Said relative orientation of each said magnetic field 11 is uniquely determined by the associated tire pressure. Senders in other tires (not shown) produce similar magnetic fields. Independent of the magnet and magnetic field orientation relative to a tire and urged by tire pressure, each of said provided magnetic fields 11 further revolves as the associated sender 10 orbits around the axle of corresponding wheel 13. Magnetically coupled pressure readers 12 contain internal sensors (not shown) to sense the provided magnetic fields 11 from associated senders 10. Thus the magnetic field at each magnetically coupled pressure reader 12 changes in both direction and strength independently (1) in response to tire pressure urging and (2) in response to the revolution of the corresponding wheel 13. Magnetically coupled pressure readers 12 are mounted on the vehicle nearby the corresponding wheels 13. Readers 12 also analyze waveforms produced by the internal magnetic field sensors to recover and report the pressure in tires 14 to display devices, such as display device 18.

Magnetic field sensors within readers 12 may be essentially of the types disclosed in Burns, U.S. Pat. No. 6,520,006 and U.S. Pat. No. 6,647,771. Magnetic field sensors within readers 12 may comprise one or more magnetoresistive, magnetooptic, or Hall-effect sensors responsive to magnetic field direction and strength. Alternatively, magnetic field sensors within readers 12 may comprise one or more induction coils that are responsive to the time rate of change of magnetic field component Tire revolution produces time varying magnetic fields at the locations of readers 12. Signal cables 16 couple the outputs of readers 12 to a pressure display or warning device 18. Alternatively, the functions of display device 18 may be incorporated into or combined with other vehicular instrumentation and display means.

Preferred Embodiment of the Magnetically Coupled Pressure Sender

Figure 2A:
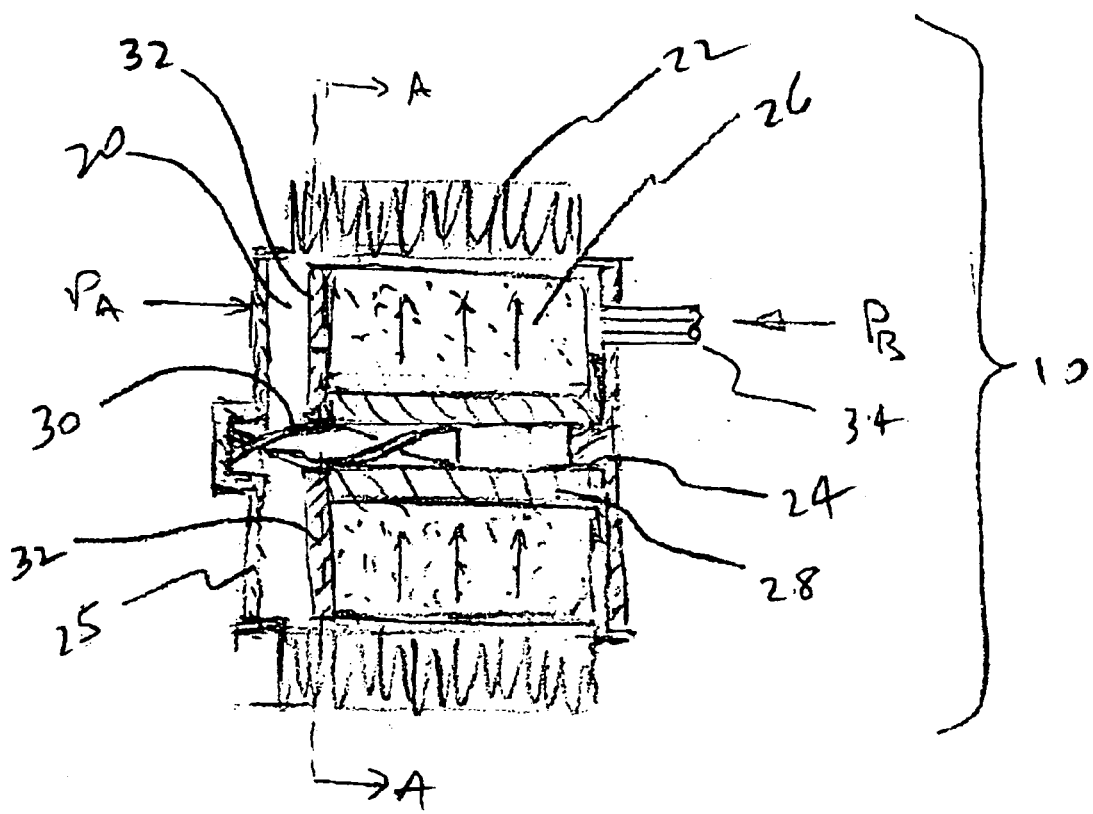
FIG. 2A is a cross section of a magnetically coupled pressure sender wherein the sending magnet is rotated by a translating helical member.

FIG. 2A shows a cross section of the preferred embodiment of magnetically coupled pressure sender 10. Bellows 22, first end cap 24, and second end cap 25 comprise a flexible and substantially cylindrical sealed pressure vessel 20. Vessel 20 is optionally penetrated by pressure port 34. Bellows 22 is compressed or expanded longitudinally according to the difference between external pressure $P_A$ and internal pressure $P_B$ communicated via port 34. In this first case sender 10 is a differential or gauge pressure sender. Optionally, port 34 may be deleted and vessel 20 evacuated, so that internal pressure $P_B$ is substantially close to zero. In this second case sender 10 is an absolute pressure sender.

Figure 2B:
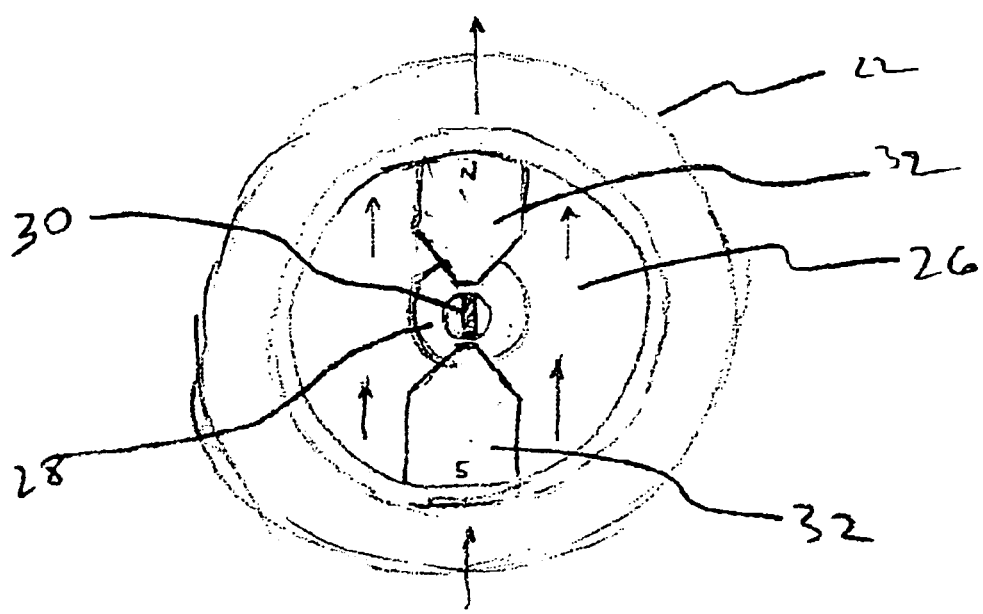
FIG. 2B is a cross section of the magnetically coupled pressure sender of FIG. 2A perpendicular to the axis of rotation of the magnet.

Vessel 20 contains cylindrical annular magnet 26. Magnet 26 is supported by non-magnetic narrow cylindrical annular bearing (or sleeve) 28 and is mechanically free to rotate around bearing 28. Alternatively, magnet 26 may be attached to bearing 28 so that both rotate together with respect to vessel 20. Magnet 26 is magnetized in a direction transverse to its axis as shown by the arrows. (FIG. 2B shows a transverse cross section A—A through sender 10). Helical ribbon 30 is attached to end plug 26 substantially concentrically with the axis of magnet 26. Helical ribbon 30 is preferably composed of material with high magnetic permeability and may easily be manufactured by twisting a flat ribbon. Helical ribbon 30 passes through the center bore of annular bearing 28 and is free to slide longitudinally within bearing 28. In the preferred embodiment, bearing 28 is partly supported by and is also free to rotate around helical ribbon 30. Bearing 28 is also supported by a boss or other means on end cap 24, and optionally may freely rotate with respect to end cap 24. Bearing 28 may be restrained mechanically by various means to prevent significant longitudinal movement of itself or magnet 26. Alternatively, all or part of end cap 24 may be composed of high magnetic permeability material so that magnetic attraction by and to magnet 26 prevents significant longitudinal movement.

Magnetic pole pieces 32 are attached to an end of magnet 26. Pole pieces 32 are preferably composed of high magnetic permeability material and serve to concentrate magnetic flux in a narrow region along and across helical ribbon 30. Magnet 26 will tend naturally to rotate to a position of minimum magnetic energy. Said minimum energy will occur when pole pieces 32 are in substantial alignment with the wide transverse dimension of helical ribbon 30. Transverse motion of helical ribbon 30 in response to pressure change acting on bellows 22 thus produces proportional rotary motion of magnet 26. In turn, said rotary motion of magnet 26 will alter the direction and strength of the distant magnetic field sensed by readers 12. Reference is made to certain previous art, as exampled by U.S. Pat. No. 2,722,837 to Dwyer, wherein a magnetic circuit is translated past a similar type of helix, causing a gauge dial pointer attached to the helix to rotate. That is, the helix is held in place longitudinally while being free to rotate whereas the magnetic circuit is prevented form rotating while being free to move longitudinally. In the claimed invention, the actions of the magnetic circuit and helix are now reversed. There is no dial pointer, and the magnet is free to rotate while being held longitudinally and the helix is free to translate longitudinally while prevented from rotating. Furthermore, rotating the magnet rather than the helix provides a new functionality: Additional rotation and change of the distant magnetic field sensed remotely. Thus magnet 26 simultaneously serves the novel dual purposes of (1) producing the distant magnetic field sensed remotely by readers 12, and (2) to convert translation of helical ribbon 30 due to pressure urging into rotary motion.

Figure 3A:
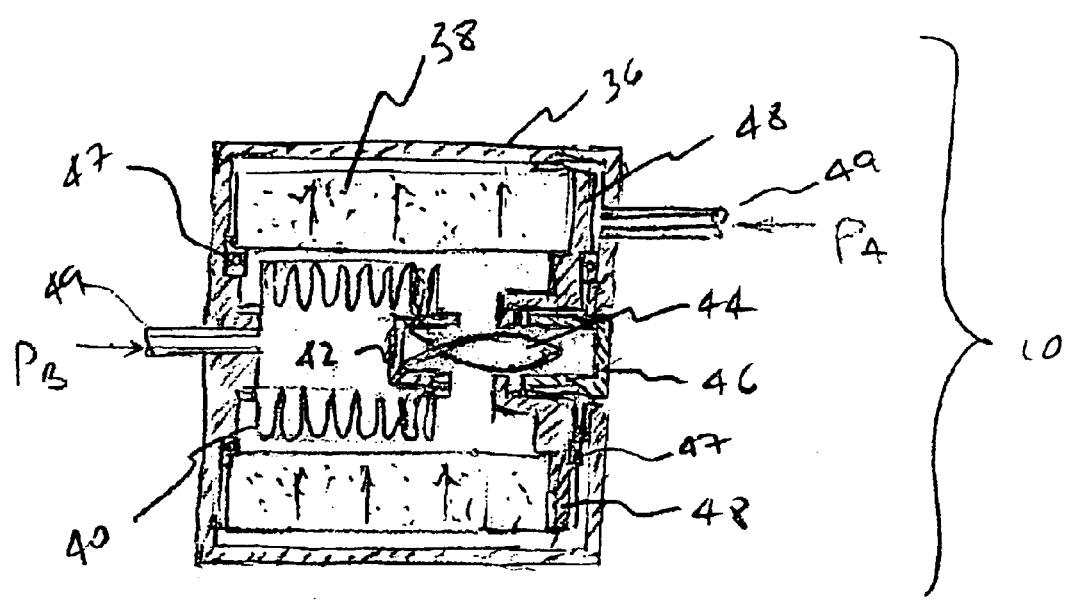
FIG. 3A shows a cross section through an alternative magnetically coupled pressure sender wherein the pressure bellows is inside the rotated magnet.

Alternate and Additional Embodiments of the Magnetically Coupled Pressure Sender FIG. 3A shows a cross section of an alternative magnetically coupled pressure sender 10. This alternative is useful when small bellows are required, as in situations where the sensed pressure is high and a compact sender 10 is desired. In FIG. 3A bellows 40 is contained within the center bore of mechanically freely rotating annular magnet 38. Magnet 38 is magnetized transversely to its axis as shown by the arrows. Magnetic pole pieces 48 are attached to one end of magnet 38. Bearings 47 attached to housing 36 support the assembly comprising magnet 38 and pole pieces 48, permitting free rotation of the entire assembly. Housing 36 optionally may be hermetically sealed.

Optional ports 49 permit pressure communication into bellows 40, into housing 36, or into both. Helical ribbon 44 is attached to bellows end cap 42 and extends past pole pieces 48 into housing end cup 46. Helical ribbon 44 slides and rotates freely within end cup 46. The assembly comprising magnet 38 and pole pieces 48 aligns itself rotationally with the wide dimension of helical ribbon 44 at the longitudinal position of the pole pieces. Bellows 40 expands and contracts longitudinally in accordance with pressure. Expansion and contraction of bellows 40 translates helical ribbon past pole pieces 48. In response, the assembly comprising magnet 38 and pole pieces 48 rotates to maintain alignment locally between pole pieces 48 and the wide dimension of the helical ribbon. Rotation of magnet 38 in response to pressure urging changes the direction of the magnetic field additionally at reader 12 and thereby communicates pressure information. As with the preferred embodiment, magnet 38 simultaneously serves the dual purposes of (1) producing the magnetic field sensed remotely by readers 12, and (2) to convert translation of helical ribbon 44 into rotary motion. In an additional variant of this embodiment, the assembly comprising end cap 42, helical ribbon 44, end cap 46, and pole pieces 48 may be contained substantially inside bellows 40, providing a more compact sender 10.

Figure 3B:
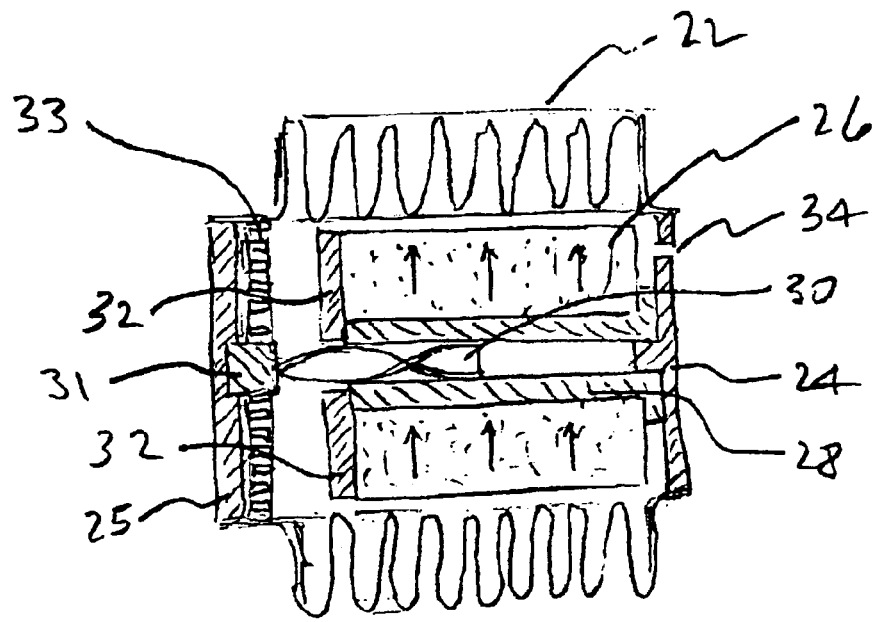
FIG. 3B shows a cross section through an alternative magnetically coupled pressure sender wherein the translating helical ribbon is coupled to the pressure bellows by means of a temperature sensitive spiral member.

FIG. 3B shows a cross section through another alternative magnetically coupled pressure sender, which additionally provides compensation for tire temperature. Tire pressure is supposed to be measured when the tire is "cold". After running, tires heat up, increasing the internal pressure, which produces a misleading pressure reading. Adding a temperature sensitive member such as spiral ribbon 33 alters the magnetic field rotation to produce a fictitious pressure reading that corresponds to the pressure that would have been measured in a cold tire. In FIG. 3B helical ribbon 30 is attached to a bearing 31 that is supported by and is further free to rotate with respect to end cap 25. Spiral ribbon 33 is attached at one end to bearing 31 and at the other end to bellows 22. Spiral ribbon 33 resembles a torsion spring and may be comprised of a bimetallic strip. Elongation and change in the average radius of curvature of spiral ribbon 33 with increasing temperature produces rotation of helical ribbon that in urges less rotation of magnet 26 and external field 11.

Figure 3C:
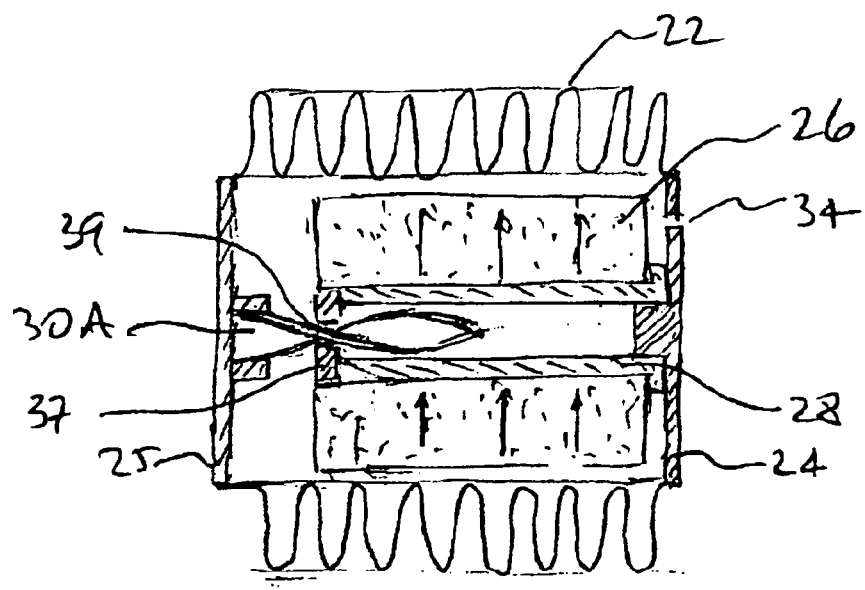
FIG. 3C shows a cross section through a magnetically coupled pressure sender wherein the translating helical ribbon engages a slot.

FIG. 3C shows a cross section through another alternative magnetically coupled pressure sender wherein the rotation of magnet 26 is urged mechanically by means of a helical ribbon 30A acting as a cam slidably engaging slot 39 in cam follower 37. Helical ribbon 30A and cam follower 37 are preferably composed of non-magnetic material. A high pitch helix is required to permit sliding motion against friction and to avoid back driving bellows 22. This alternative is useful in more static applications where potential wear affecting lifetime is not an issue and back driving must be avoided.

Details of the Preferred Embodiment of the Tire Pressure Sender

Figure 4A:
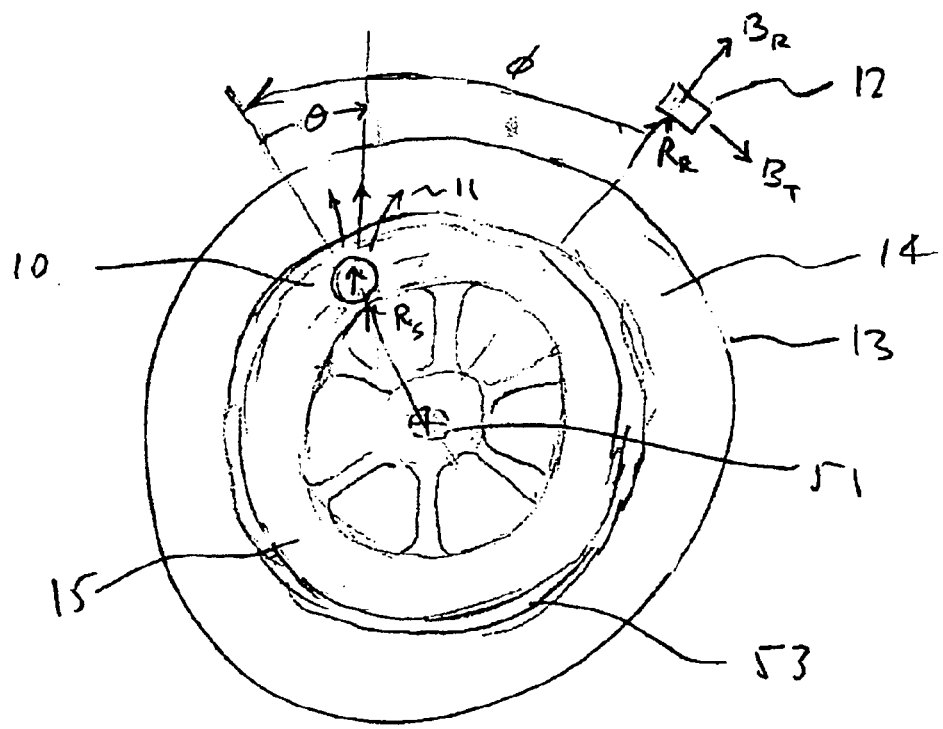
FIG. 4A is an elevation view illustrating the geometry of a magnetically coupled pressure sender inside a wheel and a pressure reader on the vehicle.

FIG. 4A is an elevation view of a vehicle wheel 13 comprising tire 14 and rim 15.

Figure 4B:
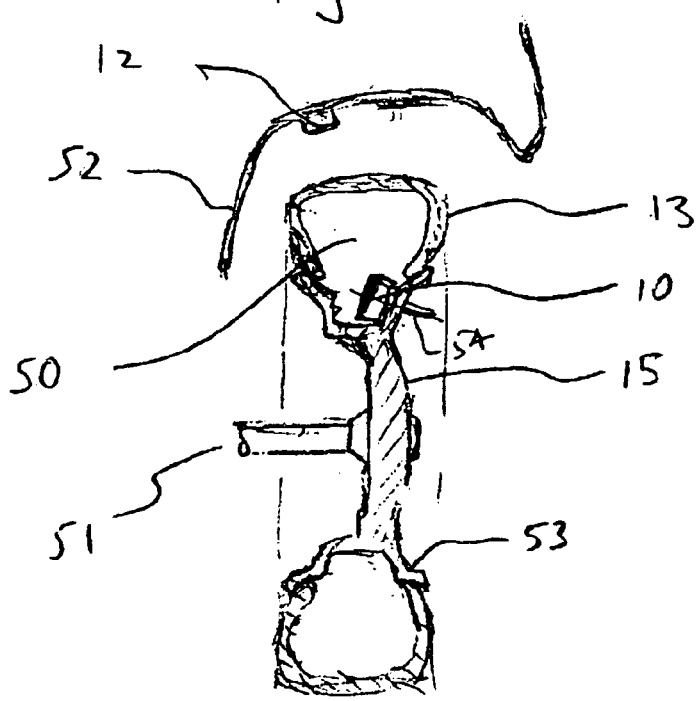
FIG. 4B is a vertical cross section through the wheel of FIG. 4A and part of a vehicle.

FIG. 4B is a cross section view through tire 14, rim 15, and vehicle body member 52. Tire 14 and rim 15 form a pressure vessel 50. Within vessel 50 magnetically coupled pressure sender 10 is attached to valve stem 54. Alternatively, sender 10 may be part of valve stem 54. In response to the pressure within vessel 50 sender 10 produces a magnetic field 11 oriented at a characteristic "pressure angle" θ with respect to radius $R_s$ of sender 10 from axle 51 of wheel 15. Magnetically coupled pressure reader 12 is located at radius $R_r$ from the axle of wheel 15. Sender 10 need not be in the same plane perpendicular to axle 51 of wheel 13 as the plane with reader perpendicular to axle 51 of wheel 13. Furthermore, the orientation of axis of sender 10 may be arbitrary with respect to axle 51.

Figure 5:
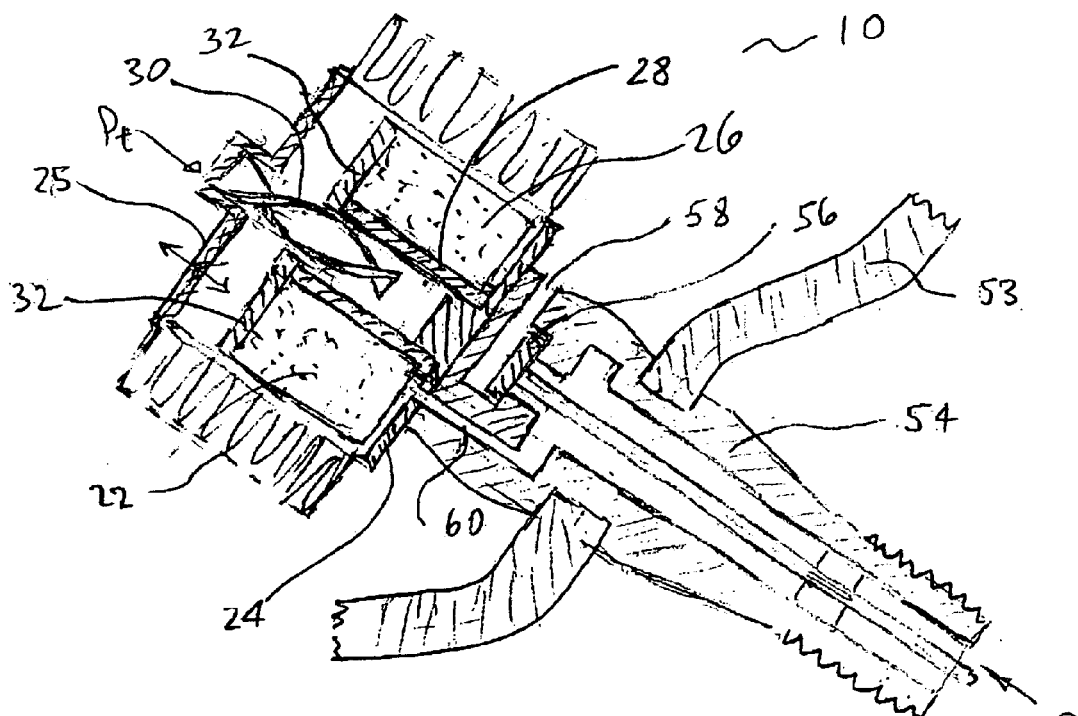
FIG. 5 is a cross section of a magnetically coupled pressure sender integrated into a valve stem.

FIG. 5 shows a cross section of a magnetic pressure sender 10 combined with valve stem 54. Valve stem 54 contains a conventional Schrader valve 56 (for clarity, not shown are certain other standard components such as springs typically comprising a conventional Schrader valve). One or more ports 58 allows passage of compressed air into tire 14 for filling. One or more air passages 60 permits communication of ambient atmospheric pressure Pa into the interior of pressure sender 10. Bellows 22 compresses and expands in accordance with the difference between tire pressure $P_t$ and ambient pressure $P_a$. Magnet 26 rotates in response to translation of helical ribbon 30 attached to bellows end cap 25.

As wheel 13 revolves, pressure angle θ remains constant (assuming no pressure change) while projected angle φ between sender 10 and reader 12 steadily increases. Projected angle φ measures wheel revolution. Wheel revolution produces changes in the strengths of the radial ($B_R$) and tangential ($B_T$) magnetic field components (with respect to the orientation of axle 51) of magnet 26 at the location of reader 12. FIGS. 6A and 6B plot examples of the radial and tangential magnetic field components as functions of tire revolution angle for several values of pressure angle θ. An induction coil will respond to the rate of change, or derivative, of a field component plotted in FIGS. 6A and 6B, with respect to time or wheel revolution angle. The signal produced by a radially oriented induction coil is similar to the signal produced by a tangentially oriented magnetic field sensor and conversely the signal produced by a tangentially oriented induction coil is similar to the signal produced by a radially oriented magnetic field sensor. An important feature of the field components plotted in FIGS. 6A and 6B (and their derivatives) is significant asymmetry. Asymmetry may be measured by calculating the third moment, or skew, of a magnetic field component or time rate of change of magnetic field components. Other and alternative means for calculating asymmetry will be apparent to those familiar with signal processing theory.

Skew of a continuous and periodic time varying quantity x is the third moment of that quantity, defined mathematically by the following equation:

$$SK_x = \oint \left(\frac{x - \mu_x}{\sigma_x}\right)^3 dt$$

The basic integration is taken over one wheel rotation. The first (mean, $\mu_x$) and second (standard deviation, $\sigma_x$) moments are also calculated over the cycle of one tire rotation. Skew is a dimensionless, ratiometric quantity that is independent of magnetic field strength and tire revolution rate. FIG. 7 plots the skews of the radial component ($SK_R$) and tangential component ($SK_T$) versus pressure angle θ corresponding to the example shown in FIGS. 6A and 6B. The basic integration interval is one wheel revolution cycle, but may be extended or limited to multiple and partial wheel rotations. Independent of wheel revolution rate, each wheel revolution cycle produces the same expected value for skew (so long as the tire pressure remains constant). Averaging multiple cycles improves the signal/noise ratio. Averaging over many revolution cycles also reduces any effects caused by including fractional wheel rotations in the skew calculation.

Also plotted in FIG. 7 is the ratio of tangential to radial skew, which exhibits a linear relationship to pressure angle over a significant and useful span.

FIG. 8 is an electronic or signal-flow block diagram of a pressure reader 12 comprising magnetic field sensor module 62, signal conditioning and amplifying module 64, analog-to-digital converter 66, and microcontroller 68. Sensor module 62 preferably comprises one or more induction coils oriented in radial or tangential directions, or both, with respect to the axle of wheel 15. Alternatively, sensor module 62 comprises one or more magnetoresistive, magnetooptic, or Hall-effect sensors responsive to magnetic field direction and strength. Conditioning and amplifying module 64 amplifies signals developed by module 62 and drives analog-digital converter (ADC) 66. Module 64 also filters the sensed signal to remove responses from extraneous fields, including AC magnetic fields. ADC 66 is preferably free running or self-triggered. Optionally, ADC 66 may be triggered by wheel rotation. Thus, pressure reader 12 may also serve as a wheel rotation rate sensor in a anti-lock braking system (ABS) Microcontroller 68 calculates the skews of the magnetic field components sensed by module 62. Microcontroller 68 further communicates corresponding tire pressure values or signals to external devices for warning and display. Preferably, microcontroller 68 performs a running average of radial and tangential magnetic field component skews, which eliminates any requirement for tire revolution indexing or timing. In addition, microcontroller 68 preferably calculates a filtered average of skew that gives more weight to the more recent outputs of sensor module 62 than to earlier outputs. Reader 12 can run continuously without any regard to the phase of wheel revolution.

CONCLUSIONS, RAMIFICATIONS, AND SCOPE

Accordingly, it can be seen that I have provided a method and apparatus for sensing tire pressure using passive senders within vehicle tires.

Although the description above contains many specificities, these should not be construed as limiting the scope of the invention but as merely providing illustrations of some of the presently preferred embodiments of this invention. Various other embodiments and ramifications are possible within its scope. For example, the bellows may be replaced by a diaphragm, a bladder, other elements capable of producing translation urged by pressure change, or a combination of these elements. In addition, the annular magnet may be replaced by a hollow magnet or magnetic circuit. A separate magnet from that used to provide the external magnetic field may be employed to urge rotation of the external magnetic field. Furthermore, the helical ribbon may be replaced by other members or elements having similar magnetic responses and properties.

Thus the scope of the invention should be determined by the appended claims and their legal equivalents, rather than by the examples given.

I claim:

1. In a method for externally sensing pressure of a fluid within a pressure vessel including the steps of
   a. locating and mounting for rotation, a magnetic field source inside of the pressure vessel containing the fluid for providing a magnetic field having an axis of symmetry rotating in a particular plane;
   b. coupling the magnetic field source to a pressure activated bellows also located inside of the pressure vessel expanding and contracting responsive to pressure differences AP between fluid pressure inside the pressure vessel and a known fluid pressure, the expansion and contraction of the bellows rotationally orienting the axis of symmetry of the provided magnetic field in the particular plane inside the pressure vessel;
   c. sensing orientation of the axis of symmetry of the provided magnetic field outside the pressure vessel; and
   d. correlating the orientation of the axis of symmetry of the magnetic field sensed to pressure within the pressure vessel, the improvement wherein said sensing of the orientation of the axis of symmetry of the provided magnetic field outside the pressure vessel comprises the steps of;
   (i) revolving the pressure vessel around an axis or rotation;
   (ii) sensing one or more vector components of the provided magnetic field during a substantial part of one or more revolutions of the revolving pressure vessel; and (iii) analyzing one or more of said sensed vector components of the provided magnetic field to ascertain the orientation of the axis of symmetry of the magnetic field within the pressure vessel.

2. The improvement as recited in claim 1 wherein said analysis comprises computing the skew of a sensed vector component of the provided magnetic field.

3. The improvement as recited in claim 1 wherein said analysis comprises computing the ratio of skews of sensed vector components of the provided magnetic field.

4. The improvement as recited in claim 1 wherein the time rate of change of the provided magnetic field is sensed.

5. The improvement as recited in claim 1 wherein said pressure vessel comprises a combination of an inflated, annular pneumatic tire hermetically sealed around a wheel rim for a vehicle.

6. The improvement as recited in claim 5 wherein said analysis comprises computing the skew of a sensed vector component of the provided magnetic field.

7. The improvement as recited in claim 5 wherein said analysis comprises computing the ratio of skews of sensed vector components of the provided magnetic field.

8. The improvement as recited in claim 5 wherein the time rate of change of the provided magnetic field is sensed.

9. In a magnetically coupled pressure gauge for indicating fluid pressure within a pressure vessel outside the pressure vessel, comprising in combination, a. a rotatable sender means mounted inside the pressure vessel for providing a rotatable magnetic field having a specific direction, the specific direction of the magnetic field in the plane parallel to an axis of symmetry of the magnetic field;

b. a pressure actuated bellows mechanism also mounted inside of the pressure vessel coupled for rotating the sender means rotationally changing orientation of the specific direction of the magnetic field in a plane parallel to to the axis of symmetry responsive to variations in fluid pressure within the vessel; and c. sensor means mounted outside of the pressure vessel for sensing and indicating orientation of the specific direction of the magnetic field provided by the sender means in a plane parallel its axis of symmetry as rotated to a particular orientation by the pressure actuated bellows mechanism, the improvement wherein said coupling of said sender means rotationally to a pressure activated bellows comprises, in combination, (i) a helical ribbon composed of a high magnetic permeability material translated according to the expansion and contraction of said bellows; and a magnetic circuit attached to the sender means aligning with said helical ribbon.

10. In a magnetically coupled pressure gauge for indicating fluid pressure within a pressure vessel outside the pressure vessel, comprising in combination, d. a rotatable sender means mounted inside the pressure vessel for providing a rotatable magnetic field having a specific direction, the specific direction of the magnetic field in the plane parallel to an axis of symmetry of the magnetic field;

e. a pressure actuated bellows mechanism also mounted inside of the pressure vessel coupled for rotating the sender means rotationally changing orientation of the specific direction of the magnetic field in a plane parallel to to the axis of symmetry responsive to variations in fluid pressure within the vessel; and f. sensor means mounted outside of the pressure vessel for sensing and indicating orientation of the specific direction of the magnetic field provided by the sender means in a plane parallel its axis of symmetry as rotated to a particular orientation by the pressure actuated bellows mechanism, the improvement wherein said sensing of said specific direction of the magnetic field provided by said sender means comprises the steps of:

(i) revolving the pressure vessel around an axis or rotation;

(ii) sensing one or more vector components of the provided magnetic field during a substantial part of one or more revolutions of the revolving pressure vessel; and (iii) analyzing one or more of said sensed vector components of the provided magnetic field to ascertain the orientation of the axis of symmetry of the magnetic field within the pressure vessel.

11. The improvement as recited in claim 10 wherein said analysis comprises computing the skew of a sensed vector component of the provided magnetic field.

12. The improvement as recited in claim 10 wherein said analysis comprises computing the ratio of skews of sensed vector components of the provided magnetic field.

13. The improvement as recited in claim 10 wherein the time rate of change of the provided magnetic field is sensed.

14. The improvement as recited in claim 10 wherein said pressure vessel comprises a combination of an inflated, annular pneumatic tire hermetically sealed around a wheel rim for a vehicle.

15. The improvement as recited in claim 14 wherein said analysis comprises computing the skew of a sensed vector component of the provided magnetic field.

16. The improvement as recited in claim 14 wherein the time rate of change of the provided magnetic field is sensed.

17. The improvement as recited in claim 14 wherein the rotatable sender means is further mounted on the tire valve stem.

18. The improvement as recited in claim 17 wherein atmospheric pressure is communicated into the rotatable sender means through one or more passages in the tire valve stem.

\* \* \* \* \*